(12) United States Patent
Hansen et al.

(10) Patent No.: US 9,335,194 B2
(45) Date of Patent: May 10, 2016

(54) SYSTEM OR A METHOD FOR MEASURING FLOW OF FLUID OR GAS

(71) Applicants: AGENA A/S, Haderslev (DK); FLONIDAN A/S, Horsens (DK)

(72) Inventors: Henning Max Hansen, Sønderborg (DK); Hans Schmidt-Hansen, Haderslev (DK)

(73) Assignees: AGENA A/S, Haderslev (DK); FLONIDAN A/S, Horsens (DK)

( * ) Notice: Subject to any disclaimer, the term of this patent is extended or adjusted under 35 U.S.C. 154(b) by 321 days.

(21) Appl. No.: 14/027,266

(22) Filed: Sep. 16, 2013

(65) Prior Publication Data

US 2015/0081232 A1   Mar. 19, 2015

(51) Int. Cl.
*G01F 1/00* (2006.01)
*G01F 1/66* (2006.01)

(52) U.S. Cl.
CPC ............. *G01F 1/667* (2013.01); *G01F 1/662* (2013.01)

(58) Field of Classification Search
None
See application file for complete search history.

(56) References Cited

U.S. PATENT DOCUMENTS

| | | | |
|---|---|---|---|
| 5,063,729 A * | 11/1991 | Fox | A01D 46/085 56/10.2 R |
| 5,277,070 A | 1/1994 | Dorr | |
| 6,047,589 A | 4/2000 | Hammond et al. | |
| 6,151,558 A | 11/2000 | Conant et al. | |
| 6,691,582 B1 | 2/2004 | Nawa et al. | |
| 7,614,310 B2 | 11/2009 | Konzelmann et al. | |
| 2005/0066744 A1 | 3/2005 | Kupnik et al. | |
| 2005/0139013 A1 | 6/2005 | Hashimoto et al. | |
| 2006/0196278 A1 | 9/2006 | Kroemer et al. | |
| 2008/0208056 A1 | 8/2008 | Kuhn et al. | |
| 2008/0242992 A1 * | 10/2008 | Criton | G01S 7/52077 600/447 |
| 2010/0145213 A1 | 6/2010 | Ganshorn | |
| 2010/0152580 A1 | 6/2010 | Ganshorn | |

FOREIGN PATENT DOCUMENTS

| | | |
|---|---|---|
| DE | 10 2007 038 474 A1 | 2/2009 |
| DE | 10 2010 035 859 A1 | 3/2011 |
| EP | 0 031 102 A2 | 7/1981 |
| EP | 0 200 896 A2 | 3/1986 |
| GB | 1 509 963 A | 5/1978 |
| GB | 2 176 894 A | 1/1987 |
| WO | 2010/122117 A1 | 10/2010 |

* cited by examiner

*Primary Examiner* — Aditya Bhat
(74) *Attorney, Agent, or Firm* — Roberts Mlotkowski Safran & Cole, P.C.; David S. Safran

(57) ABSTRACT

A system or a method for measuring flow in a flow duct has at least two ultra sound transducers. The flow of air in a duct is measured by one or more transducers transmitting beams of ultra sound controlled by a microcontroller based electronic system in which the microcontroller stores a vector of data samples for each direction of transmission, which vector includes an appropriate number of N samples forming a frame, the microcontroller multiplying each value of the frame which a complex number. Based on the result, the microcontroller calculates the flow in the duct. As a result, an efficient flow measurement of air flowing in a duct can be achieved.

9 Claims, 6 Drawing Sheets

SYSTEM OR A METHOD FOR MEASURING FLOW OF FLUID OR GAS

BACKGROUND OF THE INVENTION

1. Field of the Invention

The present invention relates to a system or a method for measuring flow of fluid or gas, which system comprises a flow duct, which flow duct comprises at least two transducers, which transducers generate at least one beam of ultrasound in the flow duct, which Transmitter/receiver circuits are connecting through a transmitter/receiver switch, which switch in a first position connect first Transmitter/receiver circuit to a transmitter circuit and second transducers are connected to a receiver circuit, which receiver circuit comprises at least a band pass filter, which band pass filter is further connected to a microcontroller, which microcontroller comprises an analogue to digital converter, which digital converter converts the analogue signal into digital data samples representing at least transit times and time difference, which microcontroller stores the data samples in a memory.

2. Description of Related Art

International Patent Application Publication WO 2010/122117 discloses a ventilation system, wherein a fan draws air from an exterior of a building or similar closed construction for circulation into an interior of the building, and produces supply airflow through a ventilator unit, which is able to cool and heat air. Moreover, the ventilator unit may be equipped with a humidifying/dehumidifying device. A controller controls the position of a valve or indirectly the speed of the fan, thereby adjusting the supply airflow in response to an input received from an ultrasound device placed in the supply air duct, wherein the ultrasound device measures the air flow and temperature.

SUMMARY OF THE INVENTION

It is a primary object of the present application to measure the flow of air in a duct by one or more transducers transmitting beams of ultra sound controlled by a microcontroller based electronic system.

The object can be achieved if the transmitter circuit and a receiver circuit are controlled by a switch, which switch perform continuous switching of transmitter circuit into a receiver circuit and the receiver circuit into a transmitter circuit, which microcontroller stores a vector of data samples for each direction of transmission, which vector comprises an appropriate number of N samples forming a frame, which microcontroller multiplies each value of the frame which is a complex number with the magnitude one and a phases representing the transmitted frequency and phase, which microprocessor generates imaginary values and a real values, which imaginary values and a real values low pass filtrated in a digital filter, which filtrated values are sent to an amplitude function and to a phase detection function, which microcontroller based on the result of the amplitude function and the result of the phase detection function calculates the flow in the duct.

In accordance with the invention of the present patent application, an efficient flow measurement of air flowing in a duct is achieved. It is realized that the damping of signals between two transducers in air is sufficiently higher than the damping that is found in traditional ultrasound flow measuring systems simply because a liquid is better matched to the impedance of the transducers. Because of the relatively weak and long signals that are transmitted and received, it is necessary to isolate the receiver from the transmitter in order to get good results of the signals received. By treating the received signals as an oscillating signal which has a curve form which is mostly a sinus curve it is possible to handle that sinus form mathematically and to divide it into the imaginary and real parts of the signal. This can lead to a situation where the amplitude can be very accurately detected, but also very precise phase detection can be made. By performing an efficient low pass filtration of the signals, it is achieved that all signals having higher frequencies are reduced so their influence on the measurement is non-existant. This can lead to a much higher precision of the measured signals.

The result of the amplitude function can further be processed by the microcontroller in a digital constant fraction discriminator (CFD). Hereby, it is achieved that arrival times $T_{UP}$ and $T_{DWN}$ are measured by the constant fraction discriminator. The output from the CFD is used to place the sampling frame so it preferably starts where the pulse would have been if there had been no dead delay. The dead delay is the delay due to signal transmissions through cables and influence from solid parts of the transducers and also if there is a delay in one of the end filters used. The start of the sampling frame can partially equal the transmission time in the air $T_{UP}$ and $T_{DWN}$. The frequency of the time clock will limit the resolution, but the precision is sufficient for the $T_{UP}$ and $T_{DWN}$ values in the denominator, but not sufficient for the various delta-Ts since this requires a higher resolution than that by which the sampling frame is adjusted.

The result of the phase detection function can further be processed by the microcontroller in a digital signal representing the time shift relative to the frame. Hereby, an increase is achieved of the resolution of the time difference $T_{UP} - T_{DWN} = \Delta T$. Hereby, highly efficient phase detection can be performed. Hereby, a relative decrease can be achieved in standard deviations with the above method compared to the deviation obtained from a zero-crossing detection of the same signal as that known from the prior art.

The system comprises a transmitter circuit comprising a band pass amplifier to limit the bandwidth of a transmission burst from the microcontroller, which band pass amplifier transmits a signal through the switch, and further, to one of the transducers. Hereby, it is achieved that the band pass amplifier can limit the band width of the transmission first from the microcontroller. Signals generated by the microcontroller do have a high slew rate That high slew rate must be reduced in order not to overload the transmitting amplifiers because these amplifiers have a maximum slew rate to which the slew rate of the output signal becomes limited. With the amplifiers in an active state, it can be achieved that the transducers are connected to the same node in the circuit, both during transmission and reception, and are always loaded with the same impedance.

The system comprises a transducer amplifier, which transducer amplifier connects the transducer to the same node in the circuit both during transmission and reception. The transducer amplifier comprises a voltage follower. Hereby, it can be achieved that the voltage on the positive input terminal is followed by the negative input terminal, and if a signal appears on the negative input terminal, it is amplified and inverted on the output of the amplifier. When the amplifier is used for transmitting the signal, the amplifier is a power amplifier of a large signals, and when receiving the amplifier acts as a pre-amplifier of small signals. The diodes coupled anti-parallel over the feedback resistor prevents the amplifier output from becoming into saturation and allow for appropriate amplification of the received signal.

The system comprises at least one transmitter receiver switch, which transmitter receiver switch comprises at least three contacts by which contacts that are not used terminals are ground connected for reducing noise. Hereby, it is achieved that an extra switch is coupled between the contacts in the first switch and perform capacitive coupling to the ground instead of the transmission signal from the other channel. This is especially important in air transducers where the received signal is normally 60 dB lower than the transmitted signal and the transmitting transducer continues ringing for a long time after excitation.

In a preferred embodiment for the invention, the band pass amplifier comprises automatic gain control, which automatic gain control comprises an operational amplifier connected with a variable feed back resistance, which feed back resistance is controlled by the microcontroller. Hereby, it is achieved that not only the band width is reduced by the band pass filtration, but also the gain control of the signal is under control. Depending on reflection or non-reflection or depending on the diameter of the duct, or maybe the change from one type of transducer to another type, there can be an extremely high difference in signal level that is received. Highly efficient transducers in a very small duct can produce a relatively good signal even in air, but in a different situation where the diameter of the tube is much higher, and maybe a rather less efficient transducer is used, the damping of the signal can be several thousands times, and a much higher amplification is necessary. Only in this way, it can be achieved that analog digital conversion can be made in a perfect way. The upper frequencies are limited to half the sampling frequency of the digital converter, and the gain has to be controlled so that also the signal level is inside the level for the digital conversion.

The present patent application further concerns a method for operating a system for measuring flow of fluid or gas, as previous disclosed, which method concerns the following steps of operation:

a: generating at least one beam of ultrasound in the flow duct by a transmitter circuit connected to a first transmission transducer, b: receiving the beam of ultrasound in the flow duct by the second transducer and the receiver circuit, c: performing a band pass filtration of the received analog signal in the receiver circuit, d: converting the analog signal in a digital signal in the microprocessor into digital data samples representing at least transit times and time difference, e: storing the data samples in a memory, f: storing a vector of data samples for each direction of transmission, g: forming a frame based on the vector comprising an appropriate number of N samples, h: multiplying each value of the frame with a complex number with the magnitude one and a phase for representing the transmitted frequency and phase, i: generating imaginary values and a real values, which imaginary values and real values are low pass filtered in a digital filter, j: sending the filtered digital signal to an amplitude function and to a phase detection function, and k: calculating the flow in the duct based on the result of the amplitude function and the result of the phase detection function.

By this method, a very efficient flow measurement in an air duct is achieved. Transducers can be placed across the duct, they can be placed so that reflection takes place, or they can be placed inside the duct so that the transmission of sound is effected directly between the transducers. By the invention according to the present application, it can be achieved that relatively simple and inexpensive transducers can be applied. Therefore, by the invention according to the present application, it is possible to achieve an inexpensive, but yet highly efficient system for measuring air flow.

DETAILED DESCRIPTION OF THE INVENTION

Figure 1:
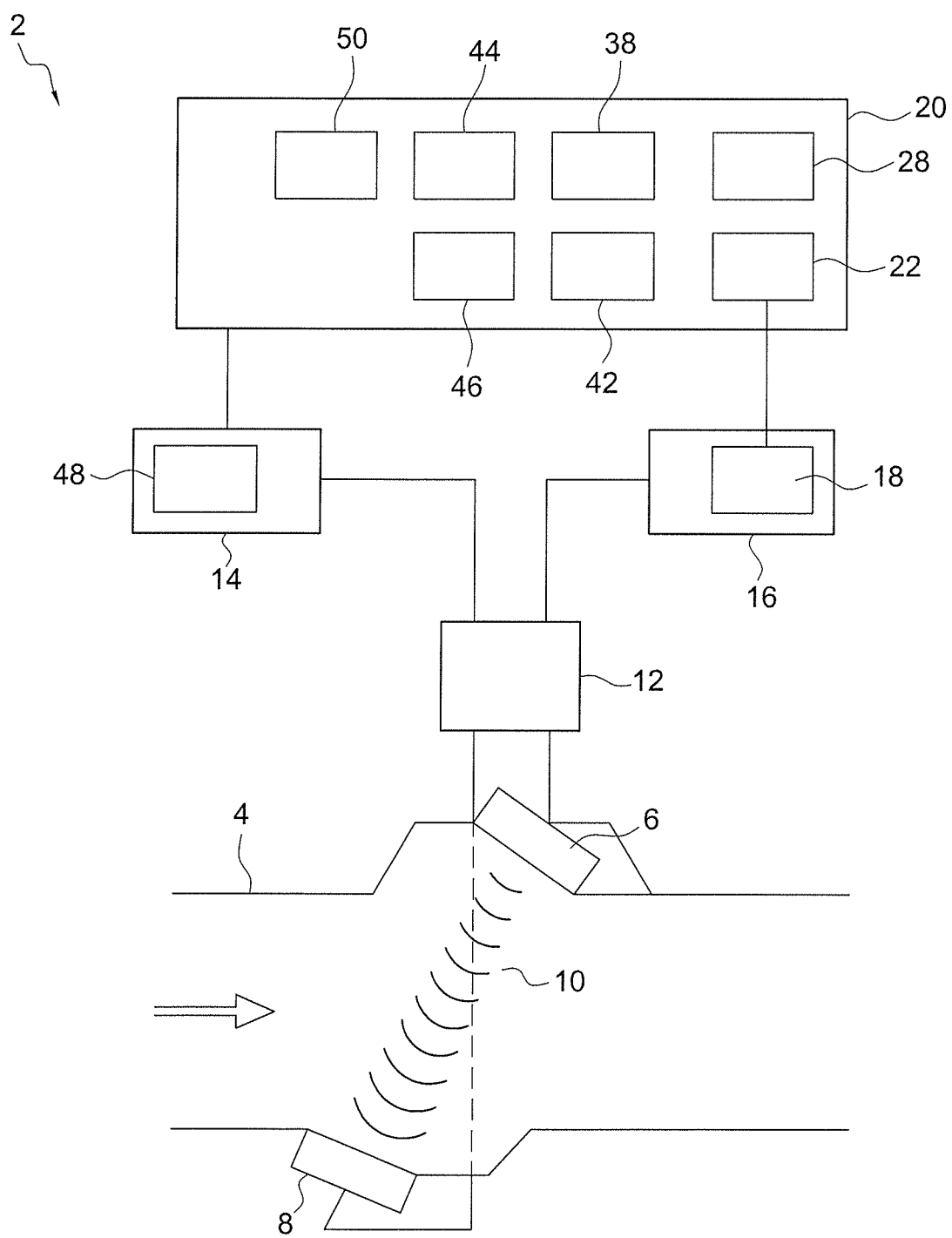
FIG. 1 shows a possible embodiment of the invention.

FIG. 1 shows a system 2 which system comprises a flow duct 4 in which a first transducer 6 and a second transducer 8 are transmitting acoustic waves 10 across the duct 4. Both transducers 6, 8 are connected to a switch 12 by which switching for receiving and transmission is effected. The transmitter receiver switch 12 is connected to a transmitter circuit 14 and to a receiver circuit 16. The receiver circuit 16 comprises a band pass filter 18 which is connected to a microcontroller 20, and the microcontroller 20 is connected to a digital converter 22. The microcontroller 20 further comprises a digital filter 38, an amplitude function 42 and a phase detection function 44. The microcontroller 20 further comprises a digital constant fraction discriminator 46. Additionally, a voltage follower 50 is shown in the microcontroller 20. The microcontroller 20 is also connected to the transmitter circuit 14 which comprises a band pass amplifier 48.

In operation, flow will be measured between the transducers 6, 8, and in one situation, the transducer 6 acts as transmitter and the transducer 8 acts as receiver, and in the next situation, the transmission occurs in the opposite direction with the transducer 6 acting as the receiver and the transducer 8 as the transmitter. On the basis of these signals, and by the means provided inside the microcontroller 20, the system can calculate the flow in a highly efficient manner.

Figure 2:
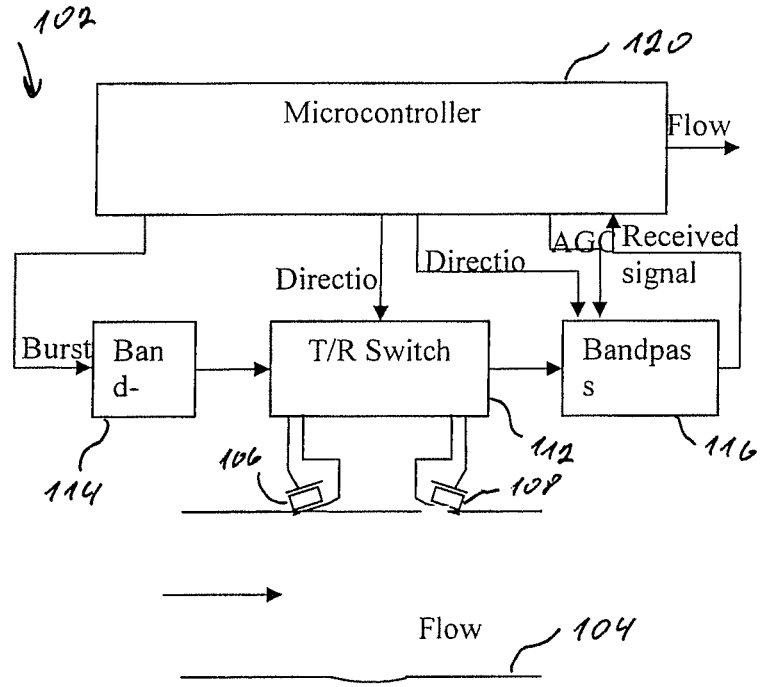
FIG. 2 shows a first alternative embodiment of the invention.
Figure 3:
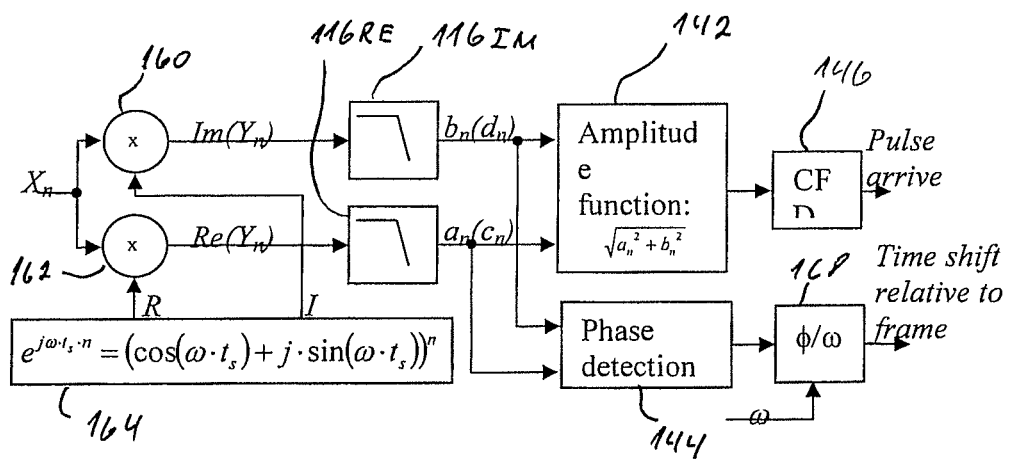
FIG. 3 shows a schematic diagram of the various technical features necessary for computer analysis of received signals.

FIGS. 2 & 3 show that the received and band pass amplified signal is analog to digital converted by a built-in analog to digital converter and is stored in memory. The measurements of transit times and time difference are solely performed by the microcontroller 120 based on these stored values.

After transmission in either direction, a number of samples are stored in the memory. The sampling starts after a time determined by an internal timer in the microcontroller 120 such that the received pulse is sampled from the beginning.

The time for the first sample is stored in the memory as one value for transmission against the flow and another value for transmission with the flow.

A vector of samples is stored for each direction of transmission. Each vector contains an appropriate number N of samples, in the actual embodiment the vector 130 contains 512 samples, but less may work well.

The first step in the signal processing is to multiply each value in the frames with a complex number with the magnitude one and a phase corresponding to the transmitted signal:

$$Y_n = X_n \cdot e^{j\omega \cdot t_s \cdot n} = X_n \cdot (\cos(\omega \cdot t_s \cdot n) + j \sin(\omega \cdot t_s \cdot n)) \quad 164$$

Where $X_n$ is the stored value at the $n^{th}$ location, $j\omega$ the angular frequency of the transmitted signal, $t_s$ the sampling time interval and n is the sample number. $0 \leq n < N$ The complex result $Y_n$ is filtered by two low pass filters, one for the real part $a_n$ and one for the imaginary part $b_n$.

After low pass filtering, 116*im*, 116*re* is the result is a complex sequence $(a_n + jb_n)$ with $n = \{0, 1, \ldots N-1, N\}$. The amplitude 142 of the received signal can, sample for sample, be found as the square root of the sum of squares.

$$A_n = \sqrt{a_n^2 + b_n^2} \quad 142$$

Figure 4:
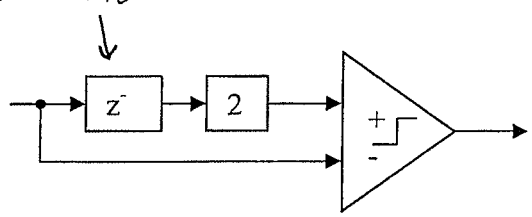
FIG. 4 shows a digital constant fraction discriminator CFD.

FIG. 4 shows a possible embodiment for an amplitude signal that is used to determine the arrival times $T_{UP}$ and $T_{dwn}$ by means of a digital constant fraction discriminator CFD 146.

The output from the CFD 146 is used to place the sampling frame so that it starts where the pulse would have been if there has been no dead delay. The dead delay is the delay due to cables, solid parts of transducers and delay in the band pass filter. The start of the sampling frame ideally equals the transmission time in the fluid $T_{UP}$ and $T_{dwn}$. The frequency of the timer clock limits the resolution, but the precision is sufficient for the $T_{UP}$ and $T_{dwn}$ values in the denominator, but not sufficient for the difference $\Delta t$ since it requires more resolution than the sampling frames are adjusted with.

The purpose of the phase detection 144 is to increase the resolution of the time difference $T_{UP} - T_{dwn} = \Delta t$. The output from the low pass filters 116*im*, 116*re* represents the phase difference between the frame with its reference sequence and the received signal. The filtered output can be further filtered to decrease the standard deviation on the phase measurements. The phase is the argument to the last complex number $(a_{N-1} + jb_{N-1})$ in the vector 130 where the amplitude and phase are stable.

If the signal from the upstream measurement is $(a_{N-1} + jb_{N-1})$ and from the downstream measurement is $(c_{N-1} + jd_{N-1})$, then the phase difference is:

$$\Delta \phi = \arg\left(\frac{a_{N-1} + jb_{N-1}}{c_{N-1} + jd_{N-1}}\right)$$

The argument can be found as shown below:

$$\frac{a_{N-1} + jb_{N-1}}{c_{N-1} + jd_{N-1}} =$$

$$\frac{a_{N-1} + jb_{N-1}}{c_{N-1} + jd_{N-1}} \cdot \frac{c_{N-1} + jd_{N-1}}{c_{N-1} + jd_{N-1}} = \frac{a_{N-1} \cdot c_{N-1} + b_{N-1} \cdot d_{N-1} + j(b_{N-1} \cdot c_{N-1} - a_{N-1} \cdot d_{N-1})}{c_{N-1}^2 + d_{N-1}^2}$$

$$\Delta \phi = \arctan\left(\frac{b_{N-1} \cdot c_{N-1} - a_{N-1} \cdot d_{N-1}}{a_{N-1} \cdot c_{N-1} + b_{N-1} \cdot d_{N-1}}\right)$$

Since the angle is small if the frame is adjusted with steps much smaller than the sample time the arctan is easily calculated by the series:

$$\arctan(x) = x - \frac{x^3}{3} + \frac{x^5}{5} - \frac{x^7}{7} \cdots$$

The actual length of the series depends on the required accuracy and the range of values of x, but the shown length will normally suffice.

If noise is present, the CFD signal 146 may fluctuate with a few samples and the nominal value of the division may be larger than the range of the arc tan function, but a few numbers out of range can be discarded without offsetting the mean value of measurements since the deviations are expected to be symmetrical.

Practical measurements have shown a three to five times decrease in standard deviation with the above method compared to the deviations obtained from a zero crossing detection on the same signal.

The band pass amplifier is necessary to limit the bandwidth of the transmission burst from the microcontroller. A square wave like the burst from the microcontroller has too a high slew rate which will bring the operational amplifier in the T/R switch 112 into slew rate limit and ruin the essential reciprocity of the T/R switch 112.

The transducer amplifiers can be coupled as voltage followers 150 or as current generators.

A main difference from common practice is that the transducer is connected to a node in the circuit without switches, the input of the transmission signal to another and the received signal appears on a third. The transducer is connected to the same node in the circuit both during transmission and reception, and thus, is always loaded with the same impedance. As a result, it obeys the "reciprocity theorem" making the time delay difference (difference in transmission time with or against the flow) unchanged by transducer changes due to temperature, contamination or aging.

Figure 5:
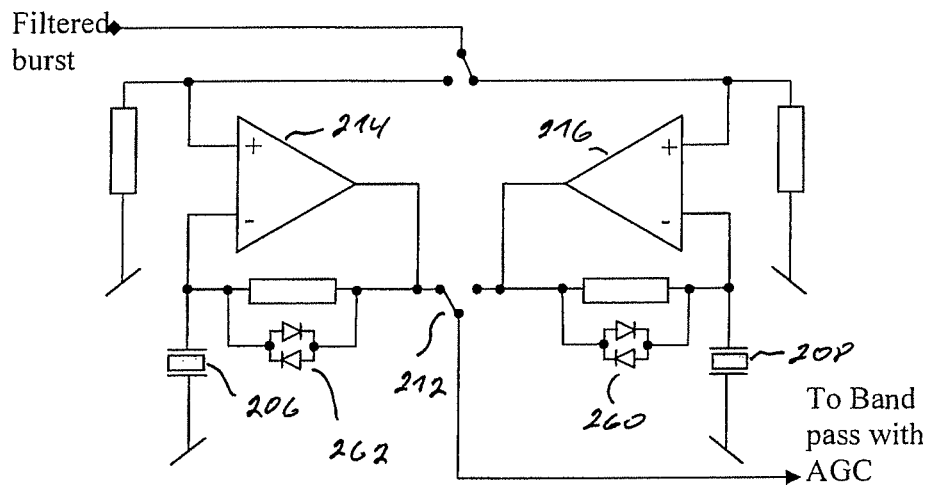
FIG. 5 shows a pre-amplifying system connected to the transducers.

FIG. 5 shows a possible embodiment for an amplifier circuit for connoting the transducers 206, 208. The voltage on the positive input terminal of one of the operational amplifiers 214, 216 is followed by the negative input terminal, and if a signal appears on the negative terminal, it is amplified and inverted on the output of the amplifier 214, 216. When the amplifier 214, 216 is used for transmitting a signal, the amplifier 214, 216 is a "power amplifier" of a large signal, and when receiving, the amplifier acts as a preamplifier of a small signal. The anti-parallel diodes 260, 262 serve as low impedance during transmission and as high impedance during receive mode preventing the amplifier 214, 216 from going into saturation under transmission of a large signal. Under reception of small signals they act virtually as disconnections compared to the resistor they are parallel to.

The reciprocity theorem requires the transmitting transducer to be driven with the same impedance as the transducer used as receiver. In FIG. 5, the impedances are virtually zero, but any impedance can be used.

Figure 6:
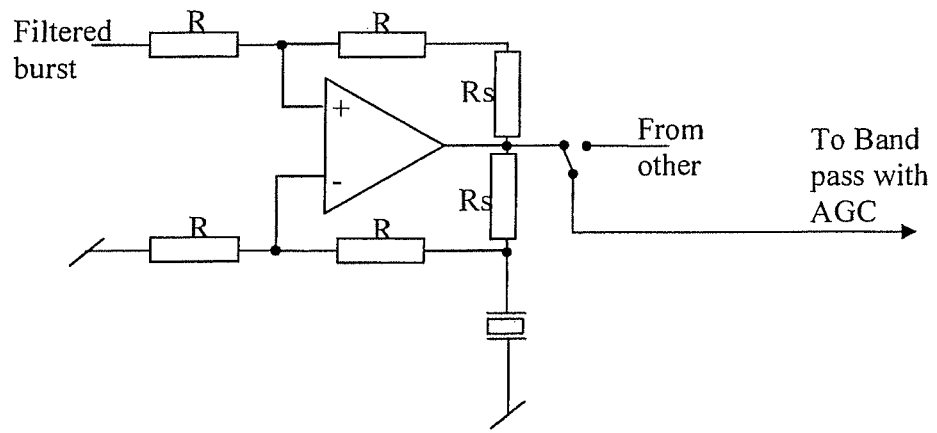
FIG. 6 shows a possible embodiment of an amplifier used as both a transmitter and a receiver.

The circuit in FIG. 6 has virtually infinite impedances as a current generator, both as power amplifier and as preamplifier.

Figure 7:
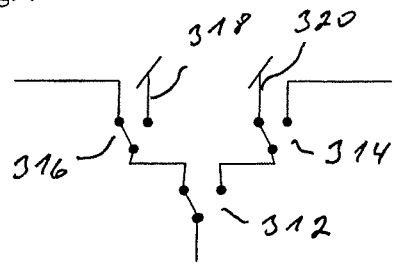
FIG. 7 shows a possible embodiment of a switch.

In principle, the T/R switch 312 of FIG. 7 can look like in FIG. 5. But in most cases, it is too simple. In practice, a more elaborate scheme must be followed to avoid over coupling of the transmission signal via the off capacitance of the switch 312. An example of minimizing the influence of the off capacitance in the switch is shown in FIG. 7.

An extra switch 314, 316 is provided enable a capacitive coupling to ground 318, 320 instead of to the transmission signal from the other channel. This is especially important in air transducers where the received signal is normally 60 dB lower than the transmitted signal and the transmitting transducer continues "ringing" long time after the excitation.

Figure 8:
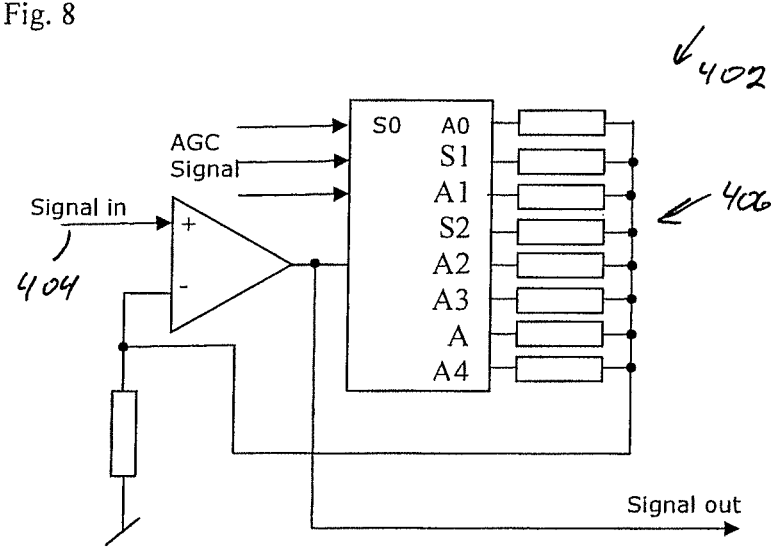
FIG. 8 shows a possible embodiment of an automatic gain control.

FIG. 8 shows a band pass amplifier 402 with AGC. The signal 404 from the front end is for air transducers in the range of few millivolts and hence too small to be analog to digital converted by the built-in analog to digital converters in standard microcontrollers. At the same time, the sampling rate with present technology of low cost microcontrollers is in the range of 1 to 2 million samples per second. In order to avoid aliasing, all frequencies above half the sampling frequency must be removed before digitizing. The frequencies used in air flow meters are up to 250 kHz, and if 500 kHz shall be damped to say 60 dB, it requires a low pass filter with a very sharp cutoff or a more than $10^{th}$ order filter.

Alternatively and much better, is a band-pass filter. The required bandwidth is 5 to 10 kHz depending of the transducer used. Sallen-Key or multiple feedback active filters are appropriate, but other filter types, such as passive LC filters, switched capacitor filters or even mechanical filters can be used.

Due to fabrication tolerances and temperature variation, the signal amplitude will change from transducer to transducer and during operation. In order to minimize the digitizing noise, the analog to digital converter will utilize the full dynamic range, so that the controller will be able to adjust the amplification. In order to keep the dynamic range of the analog to digital converter utilized, the amplification must be changed in appropriate small steps, preferably in a converter, within certain limits, the AGC will work in a way that gives the same percentage gain increase per step. Depending on the gain variation, the necessary number of steps and the size of each step will be chosen.

A simple 1 of 8 multiplexer 4051 type number can do the task by selecting feedback resistance 406 in an amplifier as shown FIG. 8

Figure 9:
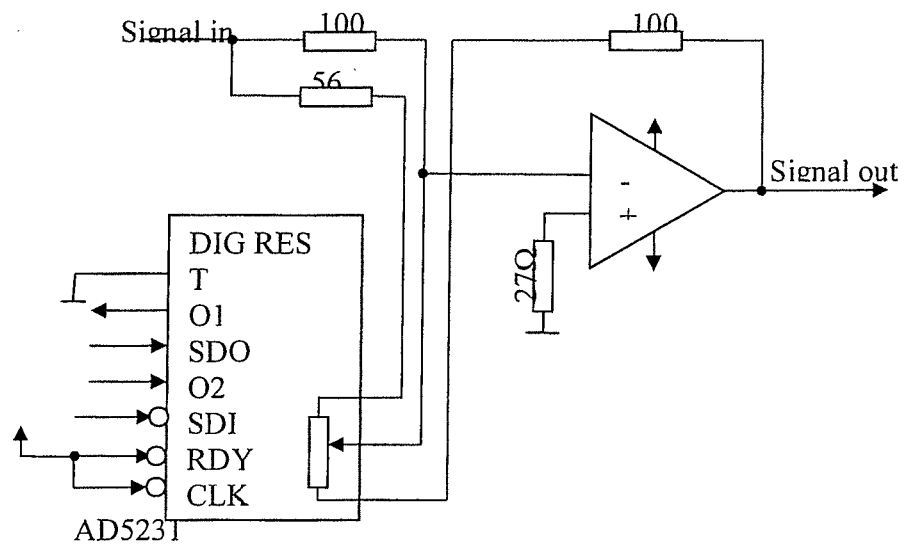
FIG. 9 shows an alternative embodiment of an automatic gain control.

If larger gain variation is necessary due to the same electronic unit be used for many different tube diameters, or if there exists a possibility for contamination that may dampen the signal, a digital resistor 406 with 1024 steps may be preferred. Since the steps are linear in most commercial versions, a scheme like the one shown in FIG. 9 may be used.

Figure 10:
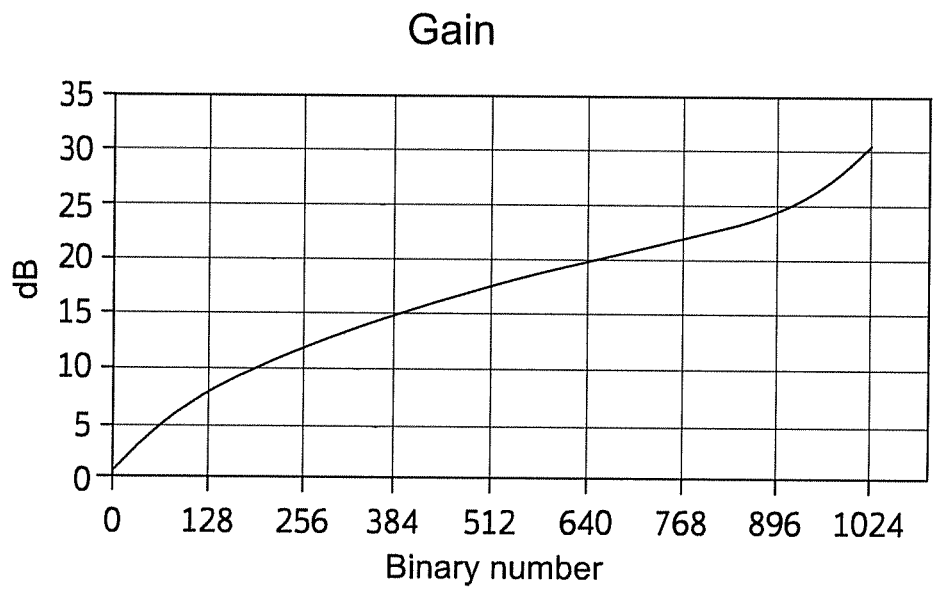
FIG. 10 shows a plot of the relation of gain vs. binary digits

This circuit gives a total gain variation of nearly 30 dB distributed over the 1024 steps as shown hereunder:

FIG. 10 shows a graph that indicates the correlation between the gain and the binary digits. As can be seen from the curvature, increasing binary numbers will achieve a much better gain.

By using an analog signal from either a digital to analog output or a filtered pulse width or rate modulated signal from the processor analog variable gain amplifiers or circuits with diodes or voltage dependent resistors can be used. Also, use of PTC resistor circuits or the like that thermally changes attenuation on high signal amplitude may be used.

Figure 11:
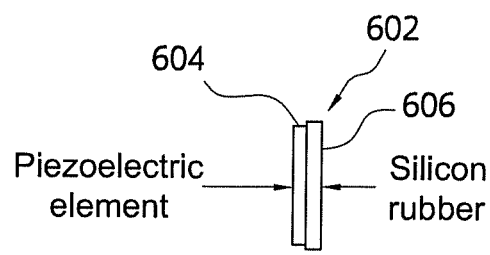
FIG. 11 shows a possible embodiment of a transducer.

FIG. 11 discloses the preferred transducers which are common piezoelectric transducers with a piezoelectric element 604 exited at the lowest radial resonance frequency and approximately a quarter wavelength silicon rubber disk 606 as impedance alignment is glued to the front surface of the piezoelectric element 604.

Alternatively, transducers used for parking sensors in cars can be used. These normally work at 40 kHz and have a wide angle transmission pattern. If these are used only direct transmission between transducer are used, due to the risk of direct transmission of a spurious signal during the transmission of the reflected signal.

Figure 12:
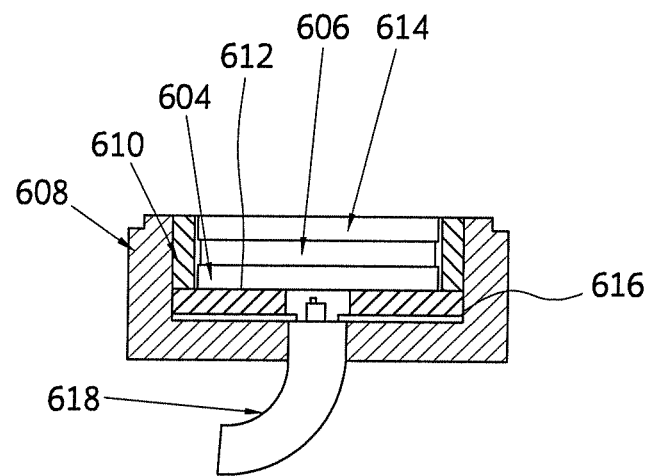
FIG. 12 shows a transducer placed in housing.

FIG. 12 shows a possible embodiment for a transducer and transducer housing with the following characteristics, for example.

| | |
|---|---|
| 608 | Transducer housing |
| 610 | Silicon rubber foam (1.5 mm 6 × 58.5) |
| 604 | Silicon rubber foam (1.5 mm Ø 16) |
| 612 | Silicon rubber foam (1.5 mm Ø 20) |
| 606 | PZT (2 × Ø15.5) |
| 614 | Silicon rubber (1,6 × Ø 16) |
| 616 | Metal screen (solder able) |
| 618 | Screened cable |

While the embodiment is shown in FIG. 12 is preferred, other forms either preformed or molded in pace may be used.

Since the sound more readily goes through solids than through air, the transducer must be isolated acoustically from the duct 4, 104, otherwise some sound would be transmitted through the tube wall and arrive at the receiving transducer 6, 8, 106, 108, and interfere with the flow signal and create nonlinearity. The isolation can be performed with a silicon rubber foam parts 610, 604 and 612 in the FIG. 12. The material of the the impedance alignment disk can be various other materials with low acoustic impedances and loss, e.g., resin filled with hollow glass spheres or hard foams.

Figure 13:
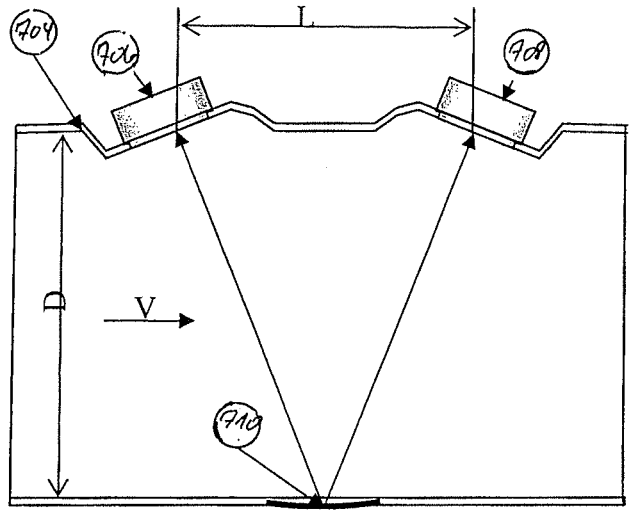
FIG. 13 shows a possible embodiment of a reflective system with two transducers and a reflecting mirror.
Figure 14:
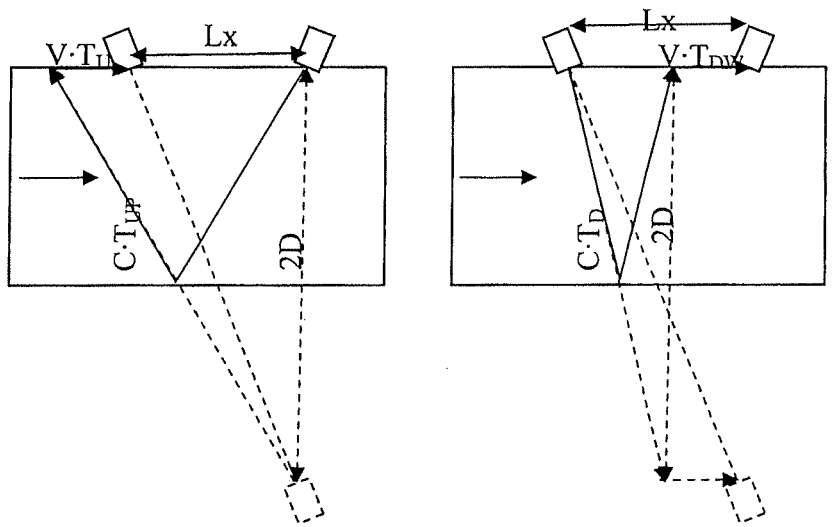
FIG. 14 shows examples of for illustrating disadvantages of the reflecting system.
Figure 15:
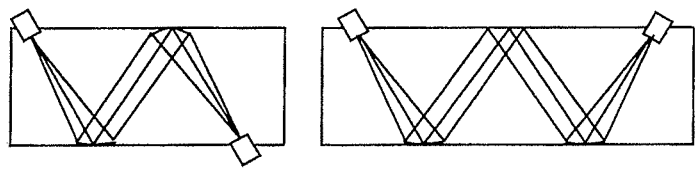
FIG. 15 shows alternative embodiment with reflections.

FIG. 13 shows a flow duct 704 with a reflection 710 whereby the two transducers 706, 708 become placed on same side next to each other. The distance between the transducers is the same for all tube diameters; as a result, the time difference Δt for the same flow and temperature becomes the same for all sizes.

Sensitivity of the Flow Duct

Let C be the sound velocity, D the tube diameter, and Lx the distance between the transducers.

Transducers alternately transmit ultrasonic pulses and alternately receive said transmitted pulses. Thus, the transmission goes with the flow and against it alternately.

By Pythagoras, the expressions can be written:

$$(C \cdot T_{UP})^2 = (2+D)^2 + (Lx + V \cdot T_{UP})^2 \text{ and } (C \cdot T_{DWN})^2 = (2+D)^2 + (Lx - V \cdot T_{DWN})^2$$

First, solve both equations for C and set the results equal to each other and solve for V:

$$Vx = \frac{4 \cdot D^2 + Lx^2}{2 \cdot Lx} \cdot \left( \frac{T_{UP} - T_{DWN}}{T_{UP} \cdot T_{DWN}} \right) \text{ or}$$

$$Vx = \frac{4 \cdot D^2 + Lx^2}{2 \cdot Lx} \cdot \left( \frac{\Delta t}{T_{UP} \cdot T_{DWN}} \right)$$

Where Δt is equal to $T_{UP} - T_{DWN}$ and is found with high precision due to the coherent detection principle.

Benefits with the reflection in the flow duct configuration:

The flow meter will be inserted in tubes with nominal bore according to standards. Thus, from $T_{UP}$ and $T_{DWN}$ it can be determined which standard diameter the flow meter is inserted in and the appropriate calibration constant can be selected from a table stored in memory.

Since sound traverses the diameter twice in opposite directions, secondary flow orthogonal to tube axis is partially canceled, so that some common flow disturbances have limited influence. The flow profile due to laminar and turbulent flow does have influence, but since the fluid always is air, the Reynold number influence can be compensated for by a calculation based on $T_{UP}$ and $T_{DWN}$.

The shift from laminar to turbulent flow creates a known shift in flow profile and the shift appears when the Reynolds number is:

laminar when Re<2300
transient when 2300<Re<4000
turbulent when Re>4000
Reynolds number Re is:

$$Re = \frac{\rho \cdot d_h}{v}$$

$\rho$ is the density of air:

$$\rho = \frac{p}{R \cdot T}$$

Where p is the pressure in pascal, R=287.05 J/(kg·K) the specific gas constant and T the temperature in kelvin. (The density for this purpose can be assumed to be 1.2 kg/m$^3$), $d_h$ is the hydraulic diameter of the pipe and v is the kinematic viscosity of air.

$$v = (0.0002 \cdot T_K^2 + 0{,}0053 \cdot T_K - 0.0327) \cdot 10^{-6} \frac{m_1^2}{s}$$

Where $T_K$ is temperature in kelvin.

The necessary correction will be determined for each dimension by flow tests, but there exists theoretical/empirical formulas for corrections.

By these measures it is possible to minimize deviations to a few percent even with flow disturbances as close as a few diameters from the inlet.

For two reflections, two parabolic mirrors will be used and for three reflections two parabolic and one flat mirror preferably will be used.

Normal direct transmission with one or more tracks is possible and will be used as an alternative. The calibration constants of this are found by standard well proven principles.

What is claimed is:

1. System for measuring flow of fluid or gas, comprising:
a flow duct,
a receiver circuit comprising at least one band pass filter,
a microcontroller comprising an analog to digital converter and the microcontroller being connected to said at least one band pass filter,
a transmitter circuit,
at least two transducers in the flow duct, each of the transducers generating at least one ultrasonic beam in a respective direction in the flow duct and being connected to the transmitter circuit and to the receiver circuit,
wherein analog to digital converter arranged to convert an analog signal received by the microcontroller into digital data samples representing at least transit times of the at least one ultrasonic beam generated by each of the at least two transducers and a time difference therebetween,
wherein microcontroller is adapted to store the data samples in a memory,
wherein the transmitter circuit and the receiver circuit are controlled by a switch that performs continuous switching of the transmitter circuit into a receiver circuit and the receiver circuit into a transmitter circuit,
wherein the microcontroller is adapted to stores a vector of data samples for each said respective direction of the of the ultrasonic beams in the flow duct, which vector comprises an appropriate number of N samples forming a frame, the microcontroller being adapted to multiply each frame value with a complex number having fixed magnitude and a phase representing a transmitted frequency corresponding to the transmitted signal in accordance with the following relationship:

$$Y_n = X_n \cdot e^{j\omega \cdot t_s \cdot n} = X_n \cdot (\cos(\omega \cdot t_s \cdot n) + j \sin(\omega \cdot t_s \cdot n))$$

where $X_n$ is the stored value at the $n^{th}$ location, $j\omega$ is the angular frequency of a transmitted signal, $t_s$ representing a sampling time interval and n is the sample number $0 \leq n < N$,
wherein the microprocessor is adapted to generate imaginary values and real values, which imaginary values and real values are low pass filtered in a digital filter and sent to an an amplitude function and to a phase detection function, and
wherein the microcontroller is adapted to calculate the flow in the duct based on the result of the amplitude function and the result of the phase detection function.

2. System according to claim 1, wherein the microcontroller further comprises a digital constant fraction discriminator which is adapted to further process the result of the amplitude function.

3. System according to claim 1, wherein the microcontroller is adapted to further process the result of the phase detection function in a digital signal representing a time shift relative to the frame.

4. System according to claim 1, wherein the transmitter circuit comprising a band pass amplifier to limit the bandwidth of a transmission burst from the microcontroller, the band pass amplifier being connected to transmit a signal through the switch and to one of the transducers.

5. System according to claim 4, wherein the band pass amplifier comprises an automatic gain control having an operational amplifier connected with a variable feed back resistance that is controlled by the microcontroller.

6. System according to claim 1, further comprising a transducer amplifier connecting each transducer to a same node in the circuit both during transmission and reception.

7. System according to claim 6, wherein the transducer amplifier comprises a voltage follower.

8. System according to claim 1, further comprising at least one transmitter receiver switch having at least three contacts, contacts not connected as terminals being connected to ground for reducing noise.

9. Method for operating a system for measuring flow of fluid or gas, comprising the following steps:
a: generating at least one ultrasonic beam by each of at least first and second transducers in a respective direction in the flow duct and transmitting an analog signal by a transmitter circuit connected to a first transmission transducer,
b: receiving the ultrasonic beam in the flow duct by the second transducer and a receiver circuit, c: performing band pass filtering of the analog signal received in the receiver circuit, d: converting the analog signal into a digital signal comprised of digital data samples representing at least transit times and time difference in a microprocessor, e: storing the data samples in a memory, f: storing a vector of data samples for each direction of transmission, g: forming a frame based on the vector comprising an appropriate number of N samples, h: multiplying each value of the frame with a complex number with the magnitude one and phases representing a transmitted frequency corresponding to the transmitted signal in accordance with the relationship:

$$Y_n = X_n \cdot e^{j\omega \cdot t_s \cdot n} = X_n \cdot (\cos(\omega \cdot t_s \cdot n) + j\sin(\omega \cdot t_s \cdot n))$$

where $X_n$ is the stored value at an $n^{th}$ location, $j\omega$ is an angular frequency of the transmitted signal, $t_s$ is a sampling time interval and n is the sample number $0 \leq n < N$, i: generating imaginary values and a real values and low pass filtering the imaginary values and real values in a digital filter, j: sending the filtered digital signal to an amplitude function and to a phase detection function, k: calculating the flow in the duct based on the result of the amplitude function and the result of the phase detection function.

\* \* \* \* \*